July 21, 1942.  J. E. NELSON  2,290,702
HOOK ATTACHING MEANS FOR PLUG LURES
Filed Dec. 21, 1939  3 Sheets-Sheet 1
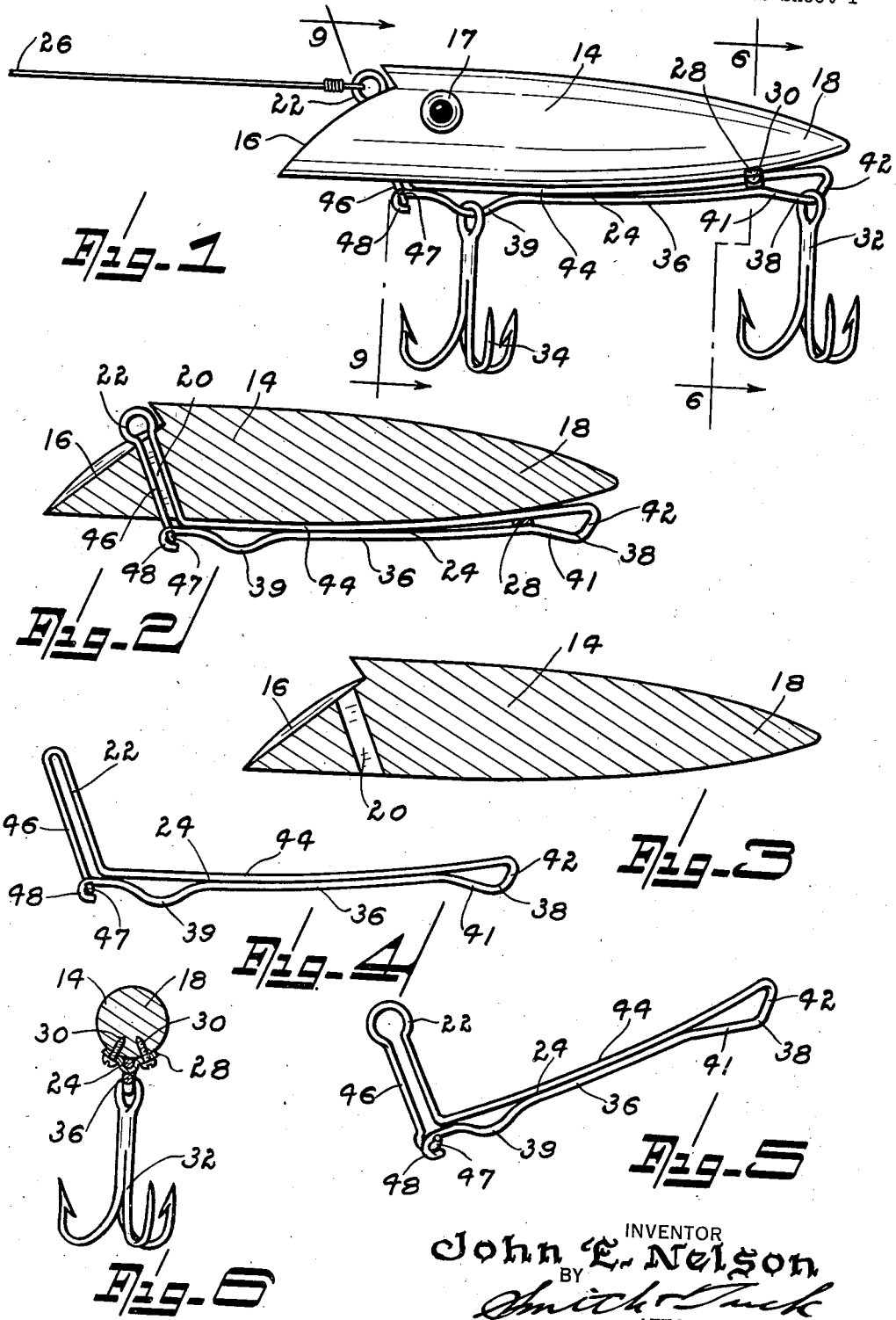

July 21, 1942.  J. E. NELSON  2,290,702
HOOK ATTACHING MEANS FOR PLUG LURES
Filed Dec. 21, 1939  3 Sheets-Sheet 2
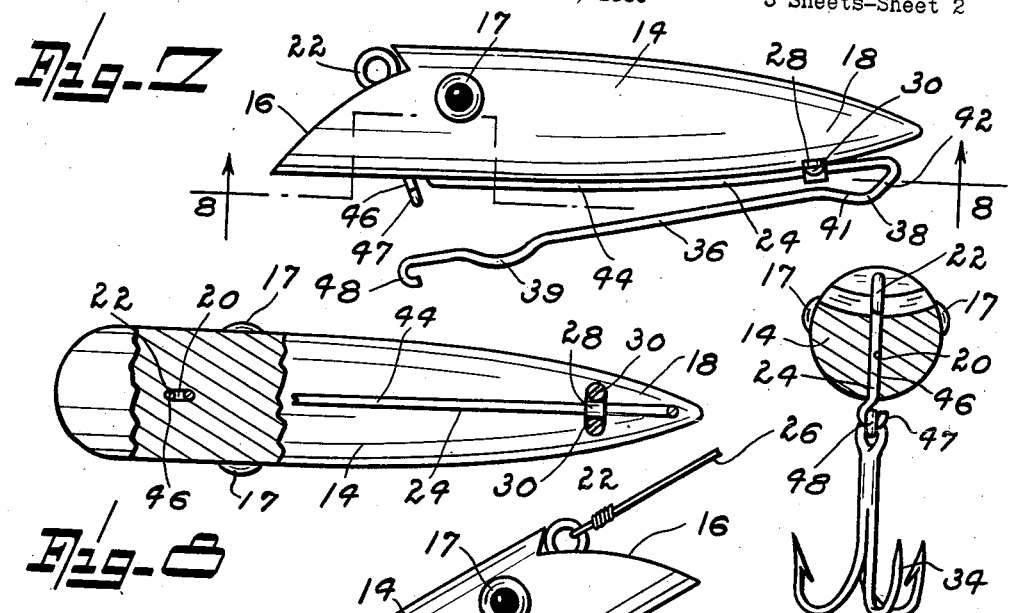
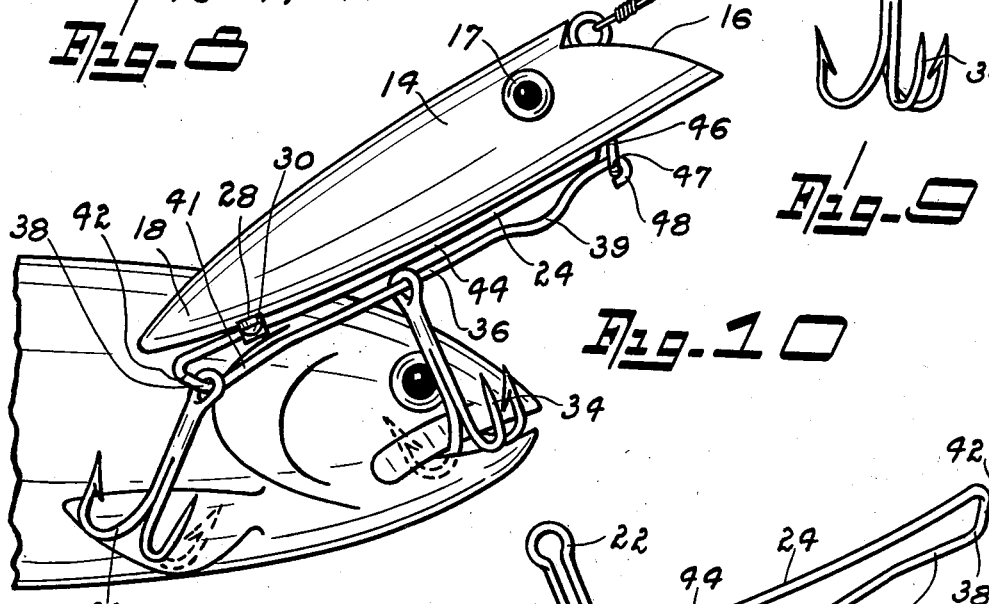
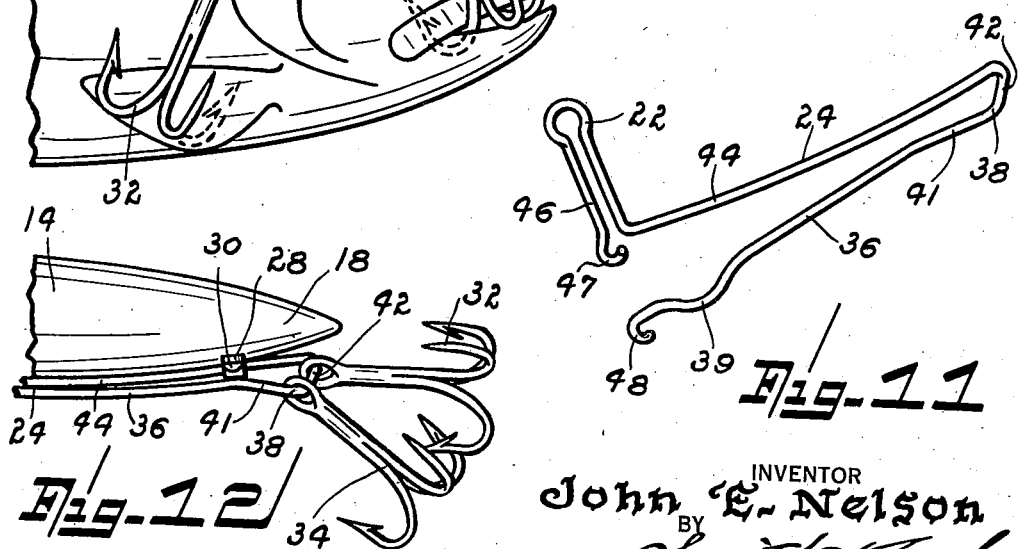
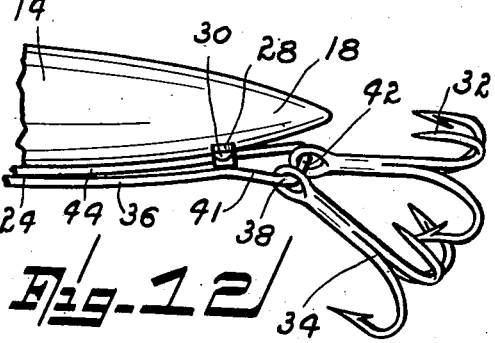
INVENTOR
John E. Nelson
BY
Smith & Tuck
ATTORNEYS

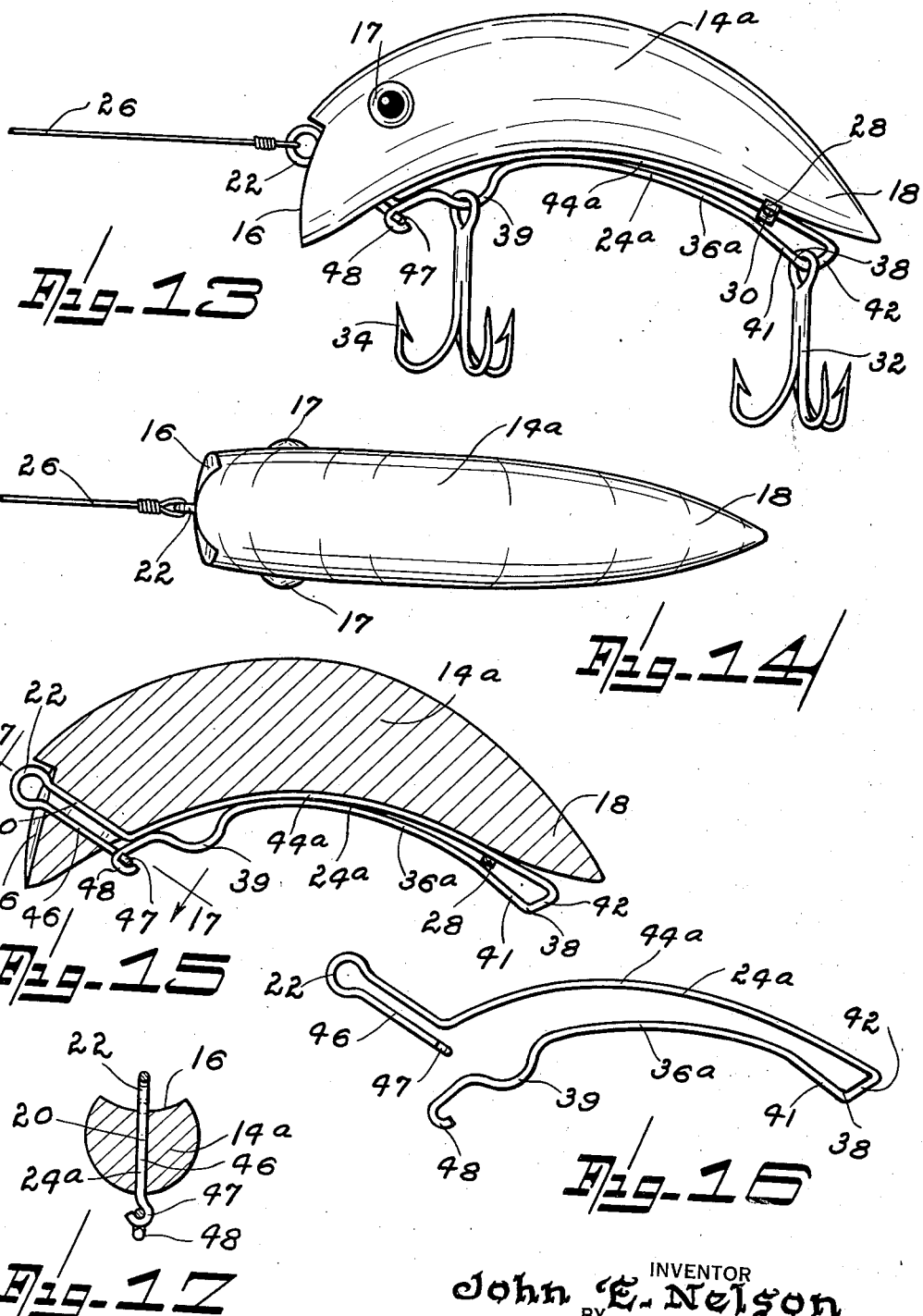

Patented July 21, 1942

2,290,702

UNITED STATES PATENT OFFICE 2,290,702

HOOK ATTACHING MEANS FOR PLUG LURES

John E. Nelson, Langley, Wash., assignor to Nelson Plug Company, Inc., Seattle, Wash., a corporation of Washington Application December 21, 1939, Serial No. 310,451

7 Claims. (Cl. 43—46)

My present invention relates to the art of fishing lures of the plug type and more particularly to a hook attaching means for plug lures.

My device consists essentially of a wire harness, or supporting means, which provides, in a single unit, the draft link by which a plug is secured to a fishing line and which forms, as part of the same, means for supporting two or more, preferably, treble type hooks beneath the lure. These hooks are supported in such a manner that they can be easily removed, or replaced, and are so arranged that when a fish strikes one of them the other hooks normally will engage the fish also.

When employing plugs for catching the larger game fish, particularly king salmon and the like, it has been found that if the hooks, usually of the treble hook variety, are secured in the wooden body of the plug by screw eyes, staples, or the like, a powerful fish often is able to free himself by twisting the hook out of the lure, or, if the anchorage of the hook is sufficiently rigid, it gives him leverage to tear the hook out of his mouth. To overcome this, a number of attempts have been made to secure the hooks to the lure by means of a flexible connector, such as wire or cuttyhunk line; these have been reasonably successful, but such means of attachment are subject to considerable damage, and a problem is presented when replacement of the hooks is necessary.

In my present structure, however, the hooks can be quickly changed as to size, sharpness, or type, inasmuch as the hook supporting means is, in effect, a safety pin arrangement requiring merely that one leg be unhooked, after the order of a safety pin, allowing the easy removal or replacement of the hooks.

A further object of my present invention is to provide means for quite definitely positioning the hook with respect to the body of the lure yet to have them so installed that when unusual strain is placed on them, as when a fish strikes with considerable force, the hooks are released, enabling same to slide together and thus more adequately secure the fish.

Another object of my invention is to provide an economical, and easily constructed means for attaching hooks to a wooden body lure in a secure manner.

A further object of my invention is to provide the hook supporting means with definitely shaped hook receiving portions arranged so that stops are provided to hold the hooks normally in the position most desired.

Other and more specific objects will be apparent from the following description taken in connection with the accompanying drawings, wherein Figure 1 is a side view of a lure made after the teachings of my invention with the two treble hooks, normally employed, shown in the position occupied by the hooks when fishing is started.

Figure 2 is a longitudinal, sectional view, in elevation, through the lure of Figure 1 with the fishing line and hooks removed therefrom.

Figure 3 is a similar sectional view in elevation showing the plug body.

Figure 4 is a side elevation of my hook supporting and securing means as the same is formed for attachment to the lure.

Figure 5 is a perspective view of the wire hook securing means of Figure 4, but showing the line attachment means and the eye formed therein as it appears after it has been passed through the slot in the plug body.

Figure 6 is a cross-sectional view taken along the line 6—6 of Figure 1.

Figure 7 is a side elevation of a lure with my hook attachment means shown in its open position ready to receive the fishing hook.

Figure 8 is a bottom plan view partly broken away, in section, as is indicated by the dashed line 8—8 of Figure 7.

Figure 9 is a cross-sectional view taken along the line 9—9 of Figure 1.

Figure 10 is a perspective view showing a plug after it has been struck by a fish and showing one of the hooks engaged in the fish's mouth and slid part way back on the hook supporting means, with the tail hook shown engaging the fish on the outside of its body.

Figure 11 is a view similar to Figure 5, but showing the wire hook supporting member in its open position.

Figure 12 is a side elevation of the tail portion of a lure showing the two hooks resting in the rear hook supporting portion.

Figure 13 is a side elevation of a modified form of lure following the teachings of my present invention.

Figure 14 is a top plan view of the plug of Figure 13.

Figure 15 is a longitudinal, sectional view along the central axis of the plug of Figure 13 with the fishing line and hooks removed therefrom.

Figure 16 is a perspective view of a modified form of hook-securing means necessitated by the curved body of the plug shown in Figures 13, 14, and 15.

Figure 17 is a cross-sectional view taken along the line 17—17 of Figure 15.

Referring to the drawings, throughout which like reference characters indicate like parts, numeral 14 designates, generally, the body of a fishing plug suitable for use with my hook attaching means. This normally has a cutout mouth portion 16, the eyes 17, and the tail portion 18 of reduced diameter. Through the mouth portion I provide a slot as 20 adapted to receive the closed wire loop 22 of my hook securing means 24. When my device is assembled in the body of the plug the closed loop 22 is passed upwardly through slot 20 and then, with a pointed tool, the extreme end is forced open into an eye after the showings of Figures 1, 3, and 5. This serves to form a proper engaging means for line 26, and it securely anchors one end of my device in the body of plug 14.

The opposite end of my hook-supporting means is preferably held to the tail portion 18 of the plug by the clip member 28, probably best illustrated in Figure 6. This is held in place by, preferably, two screws 30; these screws and clip 28, while serving to hold the hook securing means firmly to the body of the plug, also form a forward stop for the rear hook 32, and a stop to substantially limit the rearward movement of the forward hook 34. This stop, however, does not provide a positive arresting of movement of either of these hooks and when the hooks are struck by a fish, with sufficient force so as to spring downwardly the outer portion 36 of my wire hook holder, the hooks can then pass by clip 28. To normally position hooks 32 and 34, I provide for them, respectively, deformed portions 38 and 39 on member 36. The rear hook's seat, as 38, is formed with a slanting portion 41 which swings into the axis of portion 36 just behind clip 28. The rear end of the hook rest, 38, is provided with an upwardly sloping portion 42 of sufficient extent so that both hooks can rest at this point, after the showing of Figure 12. It is preferably sloping, however, so that hook 32 will rest normally in the apex formed by lines 41 and 42. In this way it is not definitely held in exact position against movement when a fish strikes, thus there is greatest likelihood of the hook properly seating itself in the fish.

Hook rest 39 is provided with a downwardly formed portion—adequately illustrated, it is believed, in the various views. It is desired to point out, however, that the wire, forming rest 39, comes into close contact with the upper body portion 44 so that a definite, although not an exact, positioning of hook 34 is provided. This positioning will normally hold the hook in place during all fishing operations except when a fish strikes; then the shock of striking is usually sufficient to move limb 36 away from limb 44 so that the hook can slide rearwardly after the showing, for instance, of Figure 10. At the front end of my hook supporting means I provide leg 46 with a sharp bend at 47 and limb 36 with a sharp bend at 48. These two bends are disposed at right angles to each other so that, when engaged, they form an adequate securing means for the extreme end of leg 36. To engage these two loops or bends, it is necessary to slightly spring the wire and thus provide a secure engagement which, however, can be sprung sufficiently to effect convenient release when the fisherman desires to change hooks. This arrangement provides a very definite anchorage for end 46 so that if an unusually heavy fish should strike the lure there is no danger of straightening out loop 22 and freeing the fish.

In Figure 13 I have illustrated a modified form of fishing lure in which the body is given a decidedly curved form, after the showing of Figures 13 and 14. This particular shaped plug, when in the water, has been found to very closely simulate the action of an injured fish, and thus is more readily sought after by certain types of fish than the more conventional form shown throughout the earlier figures of the drawings.

This modified form of structure requires a change in the hook-securing member 24a in that the curved body 14a requires a modification of the hook-securing means so that it can lie in the same general position it occupied in the other form of lure illustrated. This is arranged by curving the upper body portion 44a so that it will lie snugly against the underside of the body of the lure, and then curving the outer portion of the wire hook holder 36a so that it will hold the spaced hooks in the same relative positions occupied in the other form of lure. Otherwise, the construction is identical in that the deformed, hook-seating portions 38 and 39 are still provided and clip 28 is retained in the same form.

The foregoing description and the accompanying drawings are believed to clearly disclose a preferred embodiment of my invention, but it will be understood that this disclosure is merely illustrative and that such changes in the invention may be made as are fairly within the scope and spirit of the following claims:

1. The combination with a fish-lure of the plug type, of a hook-holder having its rear end rigidly fastened to the lure and its front end anchored in a slot of the lure, said holder including a resilient arm forming a loop for a rear hook and a bend in said arm for a front hook, and a detachable joint between the front free end of said arm and the anchored front end of the holder.

2. The combination with a fish-lure of the plug type, of a holder comprising a resilient wire bent upon itself to form an attaching bar and a hook-supporting arm extending longitudinally of the lure, said bar and arm at their junction forming a loop for a rear hook, means for rigidly fastening the attaching bar to the lure at the front end of said loop, means for anchoring the front end of the bar to the lure, a detachable joint between said anchoring means and the front free end of the arm, and a hook-suspending seat in said arm adjacent the detachable joint.

3. The combination with a fish-lure having a front slot, of a holder comprising a resilient wire bent upon itself to form an attaching bar and a suspending arm, said bar and arm at their junction forming a rear suspending-loop, means for rigidly fastening the bar to the lure at the front of said loop, said bar having a return bend anchored in said slot and a line-attaching eye fashioned in said return bend, a detachable joint between the front free end of the arm and the free end of said return bend, and a hook-suspending seat in said arm adjacent said joint.

4. The combination with a fish-lure having a front slot, of a holder comprising a resilient wire bent upon itself to form an attaching bar and a suspending arm, said bar and arm at their junction forming a loop adapted to suspend a pair of fish-hooks, means for rigidly fastening the bar to the lure and adapted to close the front end of the loop, said bar having a return bend at its front free end extending through said slot and forming a line-attaching eye, a detachable joint between the free end of the bar and the free end of the arm, and a semi-loop fashioned in said arm adjacent the detachable joint.

5. The combination in a fish-lure with a holder having spaced seats for suspending a pair of hooks, said holder including an attaching bar and means at one end of the bar for rigidly fastening the bar to the lure, said lure having a slot therethrough, said bar at its other end having a return bend passing through said slot, a line-attaching eye on the return bend, and a detachable joint between the free end of the return bend and a portion of the holder forward of the front hook-suspending seat.

6. In an interchangeable hook-rig for lures comprising, a plug having an apertured nose, a removable hook-rig embodying a wire strand having an upturned front end terminating with a loop adapted to extend through the nose aperture of the plug, the wire strand at its rear end being provided with means for attaching the tail of said plug thereto, and one or more hooks carried by the wire intermediate of its ends.

7. In an interchangeable hook-rig for lures comprising, a plug having an apertured nose, a removable hook-rig therefor embodying a wire strand having an upturned front end terminating with a loop adapted to extend through the nose of the plug aperture, the wire strand at its rear end terminating with attaching means for engaging the tail of said plug thereto, and loops depending from the body of the wire strand for attaching gangs of hooks.

JOHN E. NELSON.